United States Patent

[11] 3,619,662

[72] Inventor Francis J. E. Vachon
Hull, Quebec, Canada

[21] Appl. No. 91,650
[22] Filed Nov. 23, 1970
[45] Patented Nov. 9, 1971
[73] Assignee Canadian Patents and Development Limited
Ottawa, Ontario, Canada

[54] DATA RECEIVER AND SYNCHRONIZING SYSTEM
7 Claims, 3 Drawing Figs.

[52] U.S. Cl. 307/269, 178/69.5 R, 328/63, 328/72, 328/139
[51] Int. Cl. H03l 17/00
[50] Field of Search 178/69.5; 307/269; 328/63, 72, 75, 139

[56] References Cited

UNITED STATES PATENTS

| | | | |
|---|---|---|---|
| 3,209,265 | 9/1965 | Baker et al. | 328/72 X |
| 3,453,551 | 7/1969 | Haberle | 328/72 X |
| 3,521,185 | 7/1970 | Ley | 328/63 X |

*Primary Examiner*—Donald D. Forrer
*Assistant Examiner*—R. C. Woodbridge
*Attorney*—Weir, Marshall, MacRae & Lamb

ABSTRACT: Pulse synchronizing apparatus for non-return-to-zero data signals using a counter driven by a crystal controlled oscillator. The counter output is phase-locked to incoming data signals by enabling various feedback gates to alter the total count. The data signal is sampled and stored in a shift register. A logic circuit determines the binary number represented by the majority of the samples. A comparator responsive to the first and last samples and a comparator responsive to the first sample and the majority sample value determine which counter gates should be enabled to achieve synchronization.

INVENTOR.
Francis J. E. Vachon
By Weir, Marshall, MacRae and Lamb
PATENT AGENTS.

INVENTOR:
Francis J. E. Vachon
By: Weir, Marshall, McRae and Lamb
PATENT AGENTS

DATA RECEIVER AND SYNCHRONIZING SYSTEM

BACKGROUND OF THE INVENTION

This invention relates to a synchronizing system for receiving and decoding binary signals of the nonreturn-to-zero type.

In order to interpret the received signal it is necessary to establish at the receiver the basic synchronizing frequency or clock frequency. This presents difficulties in the case of nonreturn-to-zero signals, where no separate synchronizing signal accompanies the transmission, and it is necessary to establish the clock frequency from the data transitions. A local source of synchronizing signals is provided which can be controlled in response to data transitions in the received signal to establish a phase-locked condition. It is known to derive the local synchronization information from a binary counter driven by a stable local oscillator. By altering the particular configuration of feedback gates in the counter the total count can be varied and, thus, the local signal controlled in phase with the data signal.

The present invention relates to synchronizing systems of the type just described but which also uses a sampling procedure to determine the value of the received binary digit. Straightforward and relatively simple circuitry is provided to utilize the sampled values in adjusting the counter output to phase-lock to the received data signal.

SUMMARY OF THE INVENTION

The invention relates to a synchronizing pulse circuit in which the required pulse train is provided by a binary counter driven by a stable oscillator. Selectively enabled feedback gates control the total count of the counter. The received binary data signal is fed to a sampling circuit controlled by the stable oscillator and samples of the data are stored in a binary storage device. The sampling frequency is greater than the data rate in the received signal. A logic circuit determines the binary value of the majority of the stored samples, this signal providing, at the time of occurrence of the synchronizing pulses, an indication of the received binary signal. The first and last stored sampled values are compared; the first stored sampled value and the majority signal are compared and the results of these comparisons used to control the gates of the counter and, hence, phase-lock the synchronizing pulse train to the received data signal.

DESCRIPTION OF THE PREFERRED EMBODIMENT

Figure 1:
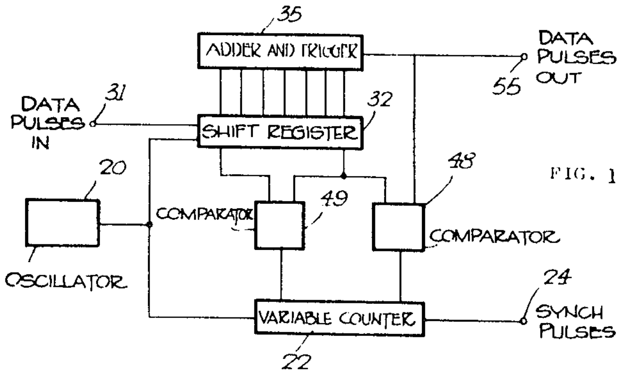
FIG. 1 is an organizational diagram in block form of the synchronizing system of this invention.

The organization and operation of the synchronizing system of the present invention will first be described with regard to the simplified schematic shown in FIG. 1. The basic timing is provided by a stable oscillator 20, preferably a crystal controlled oscillator, which supplies pulses to a counter 22, the output of counter 22 being taken to a terminal 24 to supply the required train of synchronizing pulses. Control of the time of occurrence of the synchronizing pulses is provided by varying the total count of counter 22 in dependence on the outputs of comparator circuits 48 and 49.

The data signal, of the nonreturn-to-zero type, is supplied via a terminal 31 to a shift register 32. The shift register is also supplied with the output from oscillator 20 and functions to sample the incoming data pulses. The sampled values, of which there are several for each data pulse, are stored in the various stages of the shift register. Logic circuit 35 functions to provide an indication of the binary number represented by the majority of the sampled values and the output from this circuit is supplied to an output terminal 55 giving an indication, at the time of occurrence of the synchronizing pulses, of the binary value of the data pulses. The decision as to whether the synchronizing pulses should be advanced or delayed with respect to the data pulses is performed by comparators 48 and 49. Their function will be described in greater detail below, it will be noted that comparator 49 receives signals corresponding to the first and last samples stored in the shift register and comparator 48 receives the signal corresponding to the first sample stored in the shift register and a further signal corresponding to the binary value of the majority of the samples.

Figure 2:
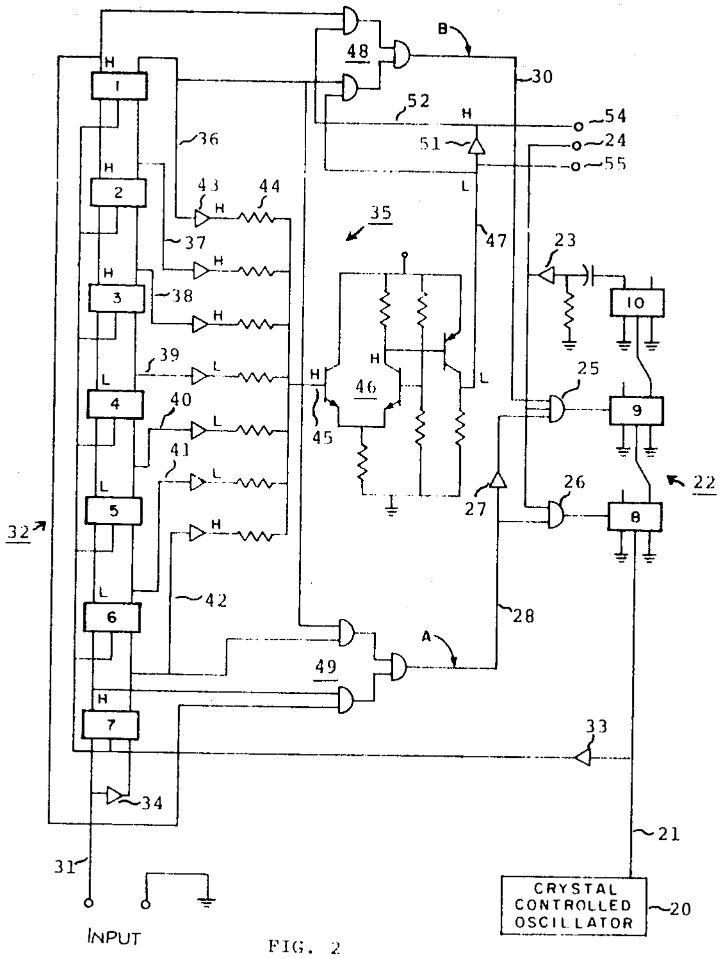
FIG. 2 is a schematic diagram of the system of FIG. 1, shown in greater detail.

Referring now to FIG. 2 a crystal controlled oscillator 20 supplies pulses on a lead 21 to a binary counter indicated generally at 22. Binary counter 22 consists of three bistable stages 8, 9 and 10, the output from stage 10 being taken through a differentiating circuit and inverter 23 to an output terminal 24. The output pulse from counter 22 is fed back to the two earlier stages; the feedback to stage 9 being through a gate 25 and the feedback to stage 8 being through a gate 26. Lead 28 provides the enabling signal for gate 26 and one of the enabling signals for gate 25. Due to an inverting circuit 27 connected between the inputs to the gates 25 and 26 it will be clear that only one of the gates can be enabled at any time. When gate 26 is enabled binary counter 22 counts to a total count of 7; when gate 25 is enabled it counts to a total count of 6 and when neither gate 25 nor 26 is enabled it counts to a total count of 8. The other enabling signal for gate 25 is supplied on a lead 30. In normal operation when proper bit-timing is achieved the counter will divide by 7. If it is necessary to advance the phase of the synchronizing signal the counter will be set to divide by 6 and, if necessary to retard the phase the counter will be set to divide by 8.

The input data signal is applied to terminal 31. This terminal is connected to a shift register indicated generally at 32 consisting of a series of J-K flip-flops identified as 1 through 7. The trigger impulse to each flip-flop is supplied from oscillator 20 via an inverting circuit 33 and the steering gates of each flip-flop are connected to the output of the preceding flip-flop with the exception of the steering gates of flip-flop 7 which are connected to input terminal 31, dual polarity input being provided by a further inverting circuit 34. The frequency of oscillator 20 is selected to provide seven samples of each received data bit and after one of the oscillator pulses, ideally coincident with the synchronizing pulse at terminal 24, these seven sampled values will appear simultaneously in flip-flops 1 through 7. The remainder of the system utilizes the information in these stored values to determine if synchronization exists or what changes are necessary to bring it about.

A logic circuit, indicated generally at 35, is provided to sense the binary digit represented by the majority of flip-flops 1 through 7. A signal is taken from one of the outputs of each of the flip-flops 1 through 7 by leads 36 through 42 respectively and each such signal is passed through an inverter such as 43 and a summing resistor 44. Resistors 44 are all connected to a common summing junction 45 which forms the input to a Schmitt trigger circuit 46. The output of trigger circuit 46 is coupled through an isolating stage to an output lead 47. Thus the signal on lead 47 is representative of the value of the majority of bits stored in register 32. An output terminal 55 is connected to lead 47 and an output terminal 54 is connected to this lead via an inverter 51 thus providing a balanced output which, at the time of occurrence of the synchronizing pulses at terminal 24, is representative of the received data.

Further information regarding the sampled values of the data pulses stored in shift register 32 is provided by comparators 48 and 49. These comparators, formed from standard NOR gates, provide an output indicative of identity or nonidentity between their respective inputs. Comparator 48 has one input connected to flip-flop 1 and the other input connected to lead 47. The necessary balanced input is provided by the inverter 51 coupled to lead 52. The output of comparator 48 is supplied on lead 30 to provide one of the enabling signals to gate 25 as previously discussed.

Comparator 49 has one input connected to flip-flop 1 and one input connected to flip-flop 7. Its output is provided on lead 28 and, as previously described, provides an enabling input to gate 26 and, via inverter 27 an inhibiting input to gate 25.

Figure 3:
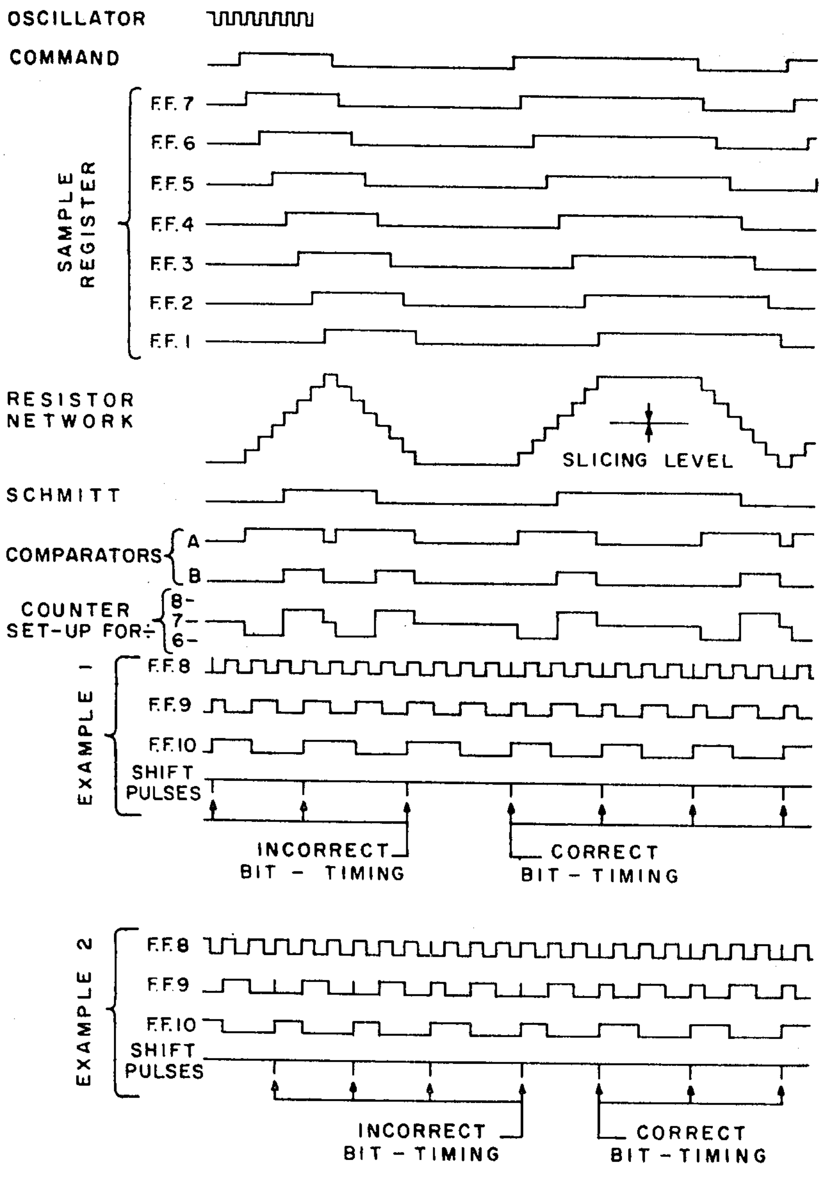
FIG. 3 shows waveforms occurring in the operation of the system shown in FIG. 2.

The operation of the circuit described above is best explained with relationship to the typical waveforms shown in FIG. 3. Shift register 32 retains sampled values of the incoming pulse and whatever signal is represented by a majority of these sampled values appears on output lead 47. If the synchronizing pulse train, appearing at output terminal 24, is in the correct time relationship with the data signal 31 then at the time of occurrence of the output pulse in counter 22 the samples stored in flip-flops 1 and 7 will be identical and the signal from comparator 49 on lead 28 will enable gate 26 and inhibit gate 25 so that counter 22 recycles to a total count of 7. If, however, there is a lack of synchronism between the pulse train at terminal 24 and the received data signal, flip-flops 1 and 7 will differ at times when there is a data change in the input signal. This results in the output from comparator 49 disabling gate 26 and enabling one of the inputs to gate 25. The decision as to whether the phase should be advanced or retarded is made by comparator 48 which compares the signal representing the majority of the bits from trigger circuit 46 with the signal stored in flip-flop 1. If it is necessary to retard the phase of the synchronizing pulse train then gate 25 is also inhibited so that counter 22 counts to 8. If, on the contrary, it is desired to advance the phase of the synchronizing pulse train then gate 25 is enabled so that counter 22 counts to a total count of 6. The following table sets out in greater detail the necessary decision logic for the operation of comparators 48 and 49.

| Samples | | | Comparators | | Counter will divide by— | Meaning next shift pulse will be in— |
|---|---|---|---|---|---|---|
| F.F. 1 | F.F. 7 | Schmitt | F.F. 1 and F.F. 7, A | F.F. 1 and Schmitt, B | | |
| 0 | 0 | 0 | Low | Low | 7 | 1 bit-time. |
| 0 | 0 | 1 | Low | High | 7 | Do. |
| 0 | 1 | 0 | High | Low | 6 | $6/7$ bit-time. |
| 0 | 1 | 1 | do | High | 8 | $1\frac{1}{7}$ bit-time. |
| 1 | 0 | 0 | do | do | 8 | Do. |
| 1 | 0 | 1 | do | Low | 6 | $6/7$ bit-time. |
| 1 | 1 | 0 | Low | High | 7 | 1 bit-time. |
| 1 | 1 | 1 | Low | Low | 7 | Do. |

This table shows the eight possible combinations of flip-flops 1 and 7 and of the Schmitt output. The corresponding outputs of the comparators and their effect on the counter are also shown.

Referring to the table and FIGS. 2 and 3 the following will be apparent:

a. When flip-flops 1 and 7 are the same, A is low and the counter divides by 7 because the output pulse is allowed to reset flip-flop 8 and not flip-flop 9.

b. When flip-flops 1 and 7 are different A is high and flip-flop 8 will not be reset but flip-flop 9 will be reset if flip-flop 1 and the Schmitt are the same (because B is now low). This makes the counter divide by 6.

c. If flip-flops 1 and 7 are different and flip-flop 1 and the Schmitt are also different then both A and B are high and none of the flip-flops will be reset. The counter then divides by 8.

If correct bit-timing is disturbed by a noise pulse it will be restored at the next data transition. This will not prevent the main shift register from being loaded properly. In fact the bit-timing could be out by as much as ±3 samples (three-sevenths of the bit-time) and the main shift register would still get loaded properly provided that 4 consecutive samples are correct and are of the same bit. When bit-timing is correct any 4 good samples will allow proper loading of the main shift register.

FIG. 3 shows typical waveforms in operation of the system. Example 1 shows how correct bit-timing is arrived at by retarding the shift pulses and example 2 shows how correct bit-timing is arrived at by advancing the shift pulses.

Thus there has been described a synchronizing circuit which produces not only a synchronizing pulse train reliably determined by a multiplicity of samplings of the input signal, but also supplies the recovered data pulses. In typical operation the frequency of oscillator 20 is about 50 k.H.z. with the synchronizing output pulses at terminal 24 shaped to 2$\mu$s. duration.

What is claimed is:

1. A circuit for providing a pulse train in synchronism with a received binary signal of nonreturn-to-zero type comprising:
   an oscillator,
   a binary counter having its input coupled to said oscillator and its output providing the required synchronizing pulse train,
   selectively enabled gates controlling the feedback of said counter output pulses to earlier stages of said counter whereby the total count of said counter may be varied,
   binary storage means,
   sampling means responsive to said oscillator to sample the received binary signal and store the sampled values in said binary storage means,
   a logic circuit coupled to said binary storage means and providing a signal indicative of the binary value of the majority of said sampled values,
   a first comparison circuit coupled to said storage means to produce a first signal indicative of identity between the first and last values stored in said binary storage means,
   a second comparison circuit coupled to said storage means and to said logic circuit to provide a second signal indicative of identity between the first value stored in said storage means and the output signal of said logic circuit,
   means connecting said first and second signals to said selectively enabled gates whereby the count in said counter is controlled to reduce deviations between said synchronizing pulse train and said received binary signal.

2. A circuit as set out in claim 1 wherein said binary storage means is a binary shift register.

3. A circuit as set out in claim 2 wherein said logic circuit comprises an analog summing network connected to each stage of the shift register and coupled to a trigger circuit responsive to the analog summing network.

4. A circuit as set out in claim 3 wherein the output of said trigger circuit is coupled to an output terminal thereby decoding the received binary signal.

5. A circuit as set out in claim 3 wherein said binary counter consists of three binary stages controlled by said selectively enabled gates normally to count to seven and said binary shift register has seven binary stages.

6. A circuit as set out in claim 5 wherein said selectively enabled gate comprises a first gate connected to the first stage of the counter and a second gate connected to the second stage of the counter, said first gate being enabled by said first signal and said second gate being enabled by said second signal and inhibited by said first signal.

7. A circuit as set out in claim 6 wherein the counter total count is seven when only said first gate is enabled, six when only said second gate is enabled and eight when neither gate is enabled.